(12) United States Patent
Heindl et al.

(10) Patent No.: US 7,857,550 B2
(45) Date of Patent: Dec. 28, 2010

(54) PROFILED CONNECTING ELEMENT AND COMBINATION SHEET PILE WALL WITH A PROFILED CONNECTING ELEMENT OF THIS TYPE

(75) Inventors: Richard Heindl, Munich (DE); Georg Wall, Munich (DE); Rob R. Wendt, Rapid City, SD (US)

(73) Assignee: Pilepro, LLC, Rapid City, SD (US)

( * ) Notice: Subject to any disclaimer, the term of this patent is extended or adjusted under 35 U.S.C. 154(b) by 359 days.

(21) Appl. No.: 11/883,592

(22) PCT Filed: Feb. 1, 2006

(86) PCT No.: PCT/EP2006/000880

§ 371 (c)(1),
(2), (4) Date: Oct. 1, 2007

(87) PCT Pub. No.: WO2006/082041

PCT Pub. Date: Aug. 10, 2006

(65) Prior Publication Data

US 2008/0145154 A1    Jun. 19, 2008

(30) Foreign Application Priority Data

Feb. 2, 2005   (EP) .................................. 05002204

(51) Int. Cl.
E02D 5/08  (2006.01)
(52) U.S. Cl. .................... 405/279; 403/403; D8/382
(58) Field of Classification Search ................ 405/271, 405/277–279, 285; D8/382; 403/66, 75, 403/76, 84, 90, 403
See application file for complete search history.

(56) References Cited

U.S. PATENT DOCUMENTS

| 1,431,273 | A | * | 10/1922 | Webb et al. | ................. | 405/279 |
| 1,431,274 | A | * | 10/1922 | Webb et al. | ................. | 405/279 |
| 1,690,499 | A | * | 11/1928 | Nolte | ......................... | 405/279 |

(Continued)

FOREIGN PATENT DOCUMENTS

DE    103 8 769    6/1957

(Continued)

*Primary Examiner*—Tara Mayo-Pinnock
(74) *Attorney, Agent, or Firm*—Karl F. Milde, Jr.; Eckert Seamans Cherin & Mellott, LLC (57) ABSTRACT

The invention relates to a connection profile (10) with a constant cross-sectional shape for joining bulkheads to beam elements. The connection profile (10) comprises a center strip (12), on which a receiving profile (16) for connecting to the beam element (102) as well as a joining profile (14) for joining a lock element of the sheet pile are formed. The joining profile (14), when viewing its cross-section, comprises a straight transition section (18), which protrudes from the center strip (12) at least approximately at a right angle and which transitions into a semicircular hook section (20) pointing in the direction of the flat side. An end section (22) follows the hook section so that the transition section (18), the hook section (20) and the end section (22), together with the flat side of the center strip (12), form a receiving channel (24), which is open toward one side, for receiving the lock element of the sheet pile. The invention also relates to a combined bulkhead in which the inventive connecting profile is used.

11 Claims, 4 Drawing Sheets

U.S. PATENT DOCUMENTS

| | | | | |
|---|---|---|---|---|
| 1,837,787 | A | * | 12/1931 | Meiser ........................ 405/279 |
| 1,851,864 | A | * | 3/1932 | Nolte .......................... 405/279 |
| 1,918,886 | A | * | 7/1933 | Amand ........................ 405/279 |
| 2,104,490 | A | * | 1/1938 | Kohler et al. ............... 405/279 |
| 6,042,306 | A | * | 3/2000 | Arndts et al. ............... 405/279 |
| 6,092,346 | A | * | 7/2000 | Even et al. .................... 52/579 |
| D471,794 | S | * | 3/2003 | Wall ............................ D8/382 |
| D521,364 | S | * | 5/2006 | Wall ............................ D8/382 |
| D527,248 | S | * | 8/2006 | Heindl et al. ................ D8/382 |
| D543,841 | S | * | 6/2007 | Heindl et al. ................ D8/382 |
| 7,413,386 | B2 | * | 8/2008 | Heindl et al. ............... 405/279 |
| 7,527,456 | B2 | * | 5/2009 | Heindl et al. ............... 405/279 |
| 2002/0102131 | A1 | * | 8/2002 | Wall ............................ 403/363 |
| 2005/0238443 | A1 | * | 10/2005 | Heindl et al. ............... 405/277 |

FOREIGN PATENT DOCUMENTS

| | | |
|---|---|---|
| DE | 297 18 052 | 3/1997 |
| EP | 0 072 118 | 7/1982 |

* cited by examiner

PROFILED CONNECTING ELEMENT AND COMBINATION SHEET PILE WALL WITH A PROFILED CONNECTING ELEMENT OF THIS TYPE

BACKGROUND OF THE INVENTION

The invention relates to a profiled connecting element which serves the purpose of attaching sheet piles to carrier elements, in particular to I-beams for constructing a combination sheet pile wall. In addition, the invention relates to a combination sheet pile wall in which the profiled connecting element according to the invention is used for connecting the sheet piles to the carrier elements.

Profiled connecting elements of the kind mentioned above are in particular used for constructing so-called combination sheet pile walls, such as the ones known, for example, from DE 297 18 052 U1, EP 0 072 118 A1 or also from DE 103 8 769 A1. Such combination sheet pile walls are in particular used for constructing quay walls, to secure banks in harbors and on rivers and also for supporting embankments and the like. Known combination sheet pile walls are formed of numerous carrier elements that are rammed into the ground with at least one sheet pile, also known as sheet piling, positioned between them. To create a closed, watertight sheet pile wall, the sheet piles are connected to one another along their longitudinal edges using interlocking elements such as hook or jaw strips, while the sheet piles located directly adjacent to the carrier elements are connected to the carrier elements through the aforementioned profiled connecting elements. To attach the profiled connecting elements to a carrier element, the profiled connecting element exhibits a profiled receiving element designed for this purpose. Attaching one of the interlocking elements of the sheet pile to be attached is carried out using an profiled attachment element of the profiled connecting element. The profiled connecting element exhibits a uniform cross-sectional shape and is adapted in its length to the length of the sheet piles and the carrier elements to be connected.

Currently, so-called hot-rolled steel piles are used for such combination sheet pile walls, that is, sheet piles that have been reformed into the desired cross-sectional shape through hot-forming. Thus far, it is not possible to use cold-rolled sheet piles that have been re-formed into the desired cross-sectional shape through cold-forming, even though they are less expensive in comparison to hot-rolled sheet piles and exhibit better surface properties, in particular surface hardness.

For example, one problem with cold-rolled sheet piles is that the structure of the sheet piles is formed differently during the cold-rolling process, depending on the degree of forming. Due to the different degrees of forming, cold-rolled sheet piles exhibit different resisting moments, strengths and properties of elasticity across their cross-section. Because of the different material properties of the sheet piles viewed across the cross-section of the sheet piles, it was until now not possible to construct combination sheet pile walls from cold-rolled sheet piles. For example, material breakage often occurs during the ramming procedure at the very location where the sheet pile had been re-formed the strongest during the cold-rolling process, i.e., in particular at the interlocking elements which have been re-formed the strongest. However, it is precisely the interlocking elements that are to ensure a secure and in particular also watertight connection between the profiled connecting element and the sheet pile.

SUMMARY OF THE INVENTION

It is the principal objective of the invention to provide a profiled connecting element, or respectively to present a combination sheet pile wall equipped with profiled connecting elements subject to the invention, where the sheeting is possible using both hot-rolled and cold-rolled sheet piles equally.

This objective is achieved by a profiled connecting element according to the invention, in which the cross-section of the profiled attachment element for the sheet pile is designed such that the central strip together with the transition section, the semicircular hook section and the end section form a receiving channel for the interlocking element of the sheet pile, that encompasses the interlocking element uniformly from all sides. In this manner, the interlocking element of the sheet pile, which is engaged in the profiled attachment element, is supported and guided during the ramming procedure across a large surface area from several sides in a defined manner. The result of the large-area support of the interlocking element in the receiving channel of the profiled attachment elements is that forces that come into existence during the ramming procedure between the profiled attachment element and the interlocking element are distributed over a large area compared to conventional profiled attachment elements. As a result, the tensile, compression and torsion stresses acting on the interlocking element of the sheet pile during the ramming procedure are significantly lower compared to the tensile, compression and torsion stresses that come into existence when using conventional profiled connecting elements, such that in particular cold-rolled sheet piles exhibit a sufficient strength and elasticity for the ramming procedure in spite of the reduced resisting moments, in particular in the area of the interlocking elements, such that their interlocking elements neither break out nor are damaged in any other manner.

For greatest-possible large-area support of the interlocking element of the sheet pile, it is recommended in a particularly preferred embodiment of the profiled connecting elements subject to the invention to design the end section as long as possible in relation to the transition section. Simulation trials showed that a particularly good support effect for the interlocking element could be achieved, when the length of the end section in relation to the length of the transition section is in a range of 1:2 to 1:3.

To ensure a secure and defined guidance of the interlocking element in the receiving channel, it is advantageous if the ratio of the inner radius of the semicircular hook section to the length of the transition section is in a range of 1:4 to 1:5.

With one particularly preferred embodiment of the profiled connecting element subject to the invention, a support strip is molded to the flat side of the central strip that is provided with the profiled attachment element protruding almost at a right angle from the flat side. Relative to the receiving channel, the support strip is positioned such that the support strip partially covers the open side of the receiving channel, and at the central strip is arranged offset to the side and the outside in relation to the end section of the profiled attachment element when viewed cross-sectionally. With the help of the support strip, an unintentional sudden or gliding disengagement of the interlocking elements of the sheet pile from the receiving channel is prevented if the interlocking element is properly hooked into the receiving channel.

Preferably, the support strip transitions with its flat side that points outward into one of the two longitudinal edges of the central strip, which facilitates the formation of the support strip during the continuous casting or rolling process of the profiled connecting element subject to the invention.

To ensure the desired effect of the support strip, the support strip should exhibit a sufficient length relative to the length of the transition section when viewed in the cross-section of the profiled connecting element; however, said length should be sufficiently small so as not to obstruct the insertion of the interlocking element into the receiving channel. Preferably, the ratio of the length of the support strip to the length of the transition section should be in a range of 1:4 to 1:5.

If so-called club carriers are used as carrier elements for erecting the combination sheet pile walls, i.e., I-beams with beam ends that are at least in some sections provided with—when viewed cross-sectionally—wedge-shaped support sections, the use of an embodiment of the profiled connecting element subject to the invention is recommended, where the profiled receiving element, when viewing the cross-section of the profiled connecting element, exhibits two support strips that protrude from the central strip and where the club carrier can be inserted with its cross-sectional wedge-shaped support section between said support strips. The first of said support strips protrudes approximately at a right angle from the central strip of the profiled connecting element, while the second of said support strips protrudes from the central strip in the direction of the first support strip at a sloped angle. The profiled receiving element formed in this manner ensures a secure and defined connection of the profiled connecting element to the club carrier or to respectively shaped carrier elements.

Since the opening of the receiving channel, through which the interlocking element of the sheet pile protrudes into the receiving channel, is designed at the side of the profiled attachment element, but the club carrier defines the position of the profiled connecting elements, two alternative advancements of the aforementioned embodiment are recommended according to the invention. With one of the two advancements, the support strip of the profiled receiving element that runs sloped at an angle to the central strip is designed directly adjacent to the longitudinal edge of the central strip, near which the transition section of the profiled attachment element is shaped. With the alternative advancement, at least the support strip of the profiled receiving element that runs at an approximate right angle to the central strip is formed directly adjacent to the longitudinal edge of the central strip, near the transition section of the profiled attachment element.

As a further possibility, it is recommended the support strips of the profiled receiving element that is to be attached to the carrier element be formed such that both support strips run at an angle to one another—relative to the central strip of the profiled connecting element, such that, when viewed in the cross-section, a channel in the shape of an isosceles triangle is formed. In this manner, the profiled connecting element with the opening of its profiled attachment element can be connected to the carrier element either pointing away from or pointing toward said carrier element, without the need for providing two differently shaped profiled connecting elements.

For example, if a conventional I-beam is used as the carrier element, the profiled receiving element exhibits, when viewed in the cross-section of the profiled connecting element, two support strips that protrude from the central strip and run at least approximately parallel to one another, and where the carrier element can be inserted with its support section in-between said support strips. In addition, the profiled connecting element may be welded to the carrier element for fastening purposes.

Furthermore, it is conceivable to design the profiled receiving element formed at the profiled connecting element such that it is placed directly onto the surface of the carrier element and welded to it. A profiled connecting element subject to the invention formed in this manner is also called a weld profiled element and is used, for example, when a pipe forms the carrier element and the profiled connecting element can be welded to the outer surface of said pipe.

To facilitate the manufacture of the profiled connecting element subject to the invention, it is recommended here as well to design the two support strips such that they transition into the two longitudinal edges of the central strip with their outward pointing flat sides in order to avoid undercuts.

According to a further aspect, the invention relates to a combination sheet pile wall which is constructed of carrier elements, in particular I-beams, and at least one sheet pile each arranged between two carrier elements, whereby a profiled connecting element is provided between the carrier elements for connecting the carrier elements to the sheet piles, and where an profiled attachment element is formed at said profiled connecting element that is engaged in an interlocking element, which is formed at the sheet pile.

According to the invention, at least one of the sheet piles is a cold-rolled sheet pile, whereby at least the respective attachment element of the profiled connecting element that is engaged in the interlocking element of the cold-rolled sheet pile is designed such that the profiled attachment element partially encompasses the interlocking element of the cold-rolled sheet pile wall and thus provides support in a large area. Both U-shaped and Z-shaped cold-rolled sheet piles are used as the sheet piles. In addition, in an advancement of the combination sheet pile wall according to the invention, it is recommended to use a profiled connecting element that is formed as the cold-rolled sheet piles.

Preferably, the interlocking element that can be used to attach the sheet pile to the profiled connecting element exhibits a hook strip with a semicircular cross-section that is engaged in the hook section of the profiled attachment element. This results in a secure connection between the sheet pile and the profiled connecting element.

The carrier elements used for the combination sheet pile wall are preferably hot-rolled carrier elements in order to ensure a sufficient resisting moment for the combination sheet pile wall.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1-8 of the drawings. Identical elements in the figures are designated with the same reference numerals.

Figure 1:
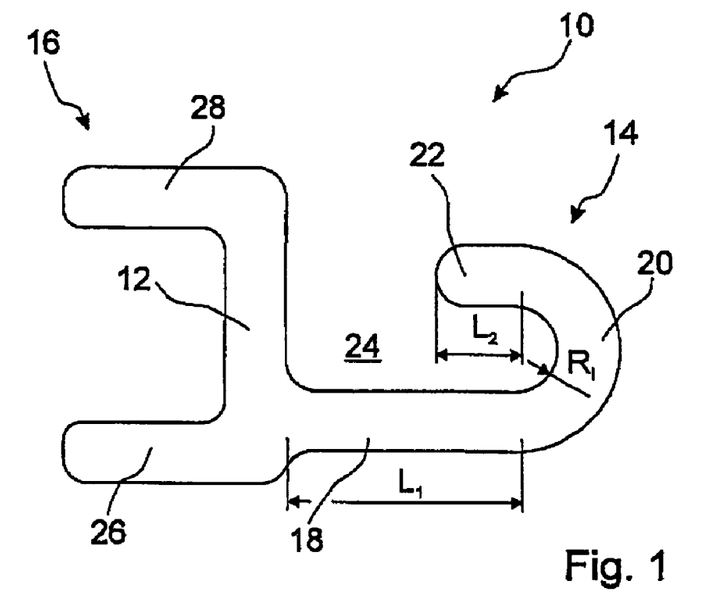
FIG. 1 shows a top view of the face side of a first exemplary embodiment of a profiled connecting element subject to the invention.

FIG. 1 shows a top view of the face side of a first exemplary embodiment of a profiled connecting element 10 subject to the invention that is used to connect sheet piles with carrier elements in order to form so-called combination sheet pile walls. The profiled connecting element 10 has a uniform cross-sectional shape and its length is adapted to the lengths of the sheet piles and carrier elements that are to be connected to each other. The profiled connecting element 10 exhibits a central strip 12 that has an profiled attachment element 14 and a profiled receiving element 16 molded to it. While the profiled attachment element 14 is used for hooking in an interlocking element of the sheet pile, the profiled receiving element 16 is used to attach the profiled connecting element 10 to the carrier element, as will be explained below.

The profiled attachment element 14 exhibits a transition section 18 that protrudes from the central strip 12 at an approximately right angle near the one longitudinal edge of the central strip 12, where said transition section 18 transitions into a hook section 20 that runs in an at least approximate semicircular shape in the direction of the central strip 12. The end of the hook section 20 transitions into an end section 22 that runs parallel to the transition section 18. The ratio of the inside radius $R_i$ of the bent hook section 20 to the length $L_1$ of the transition section is at about 1:4. The ratio of the length $L_2$ of the end section 22 to the length $L_1$ of the transition section 18 corresponds approximately to a ratio of 1:3. In the presented exemplary embodiment, the transition section 18 has a length $L_1$ of, for example, 38 mm, while the inside radius $R_i$ of the hook section 20 has a dimension of 7 mm and the end section 22 a Length $L_2$ of about 13 mm.

In this manner, the profiled attachment element 14 forms a receiving channel 24 that is open towards one side and runs in the longitudinal direction of the profiled connecting element 10, with the interlocking element of the sheet pile being hooked into said open channel 24 for connecting the interlocking element to the profiled connecting element 10.

The profiled receiving element 16 exhibits two support strips 26 and 28 that also protrude at an approximately right angle from the central strip 12 and that transition flush into the longitudinal edges of the central strip 12. The two support strips 26 and 28 run parallel to one another and are at least of approximately the same length. For attachment purposes, the carrier element, for example an I-beam, is inserted between the support strips 26 and 28 with a support section that exhibits an approximately rectangular or square cross-section. If desired, the profiled connecting element 10 can be secured additionally by welding at least one of the support strips 26 and 28 to the support section of the carrier element.

Figure 2:
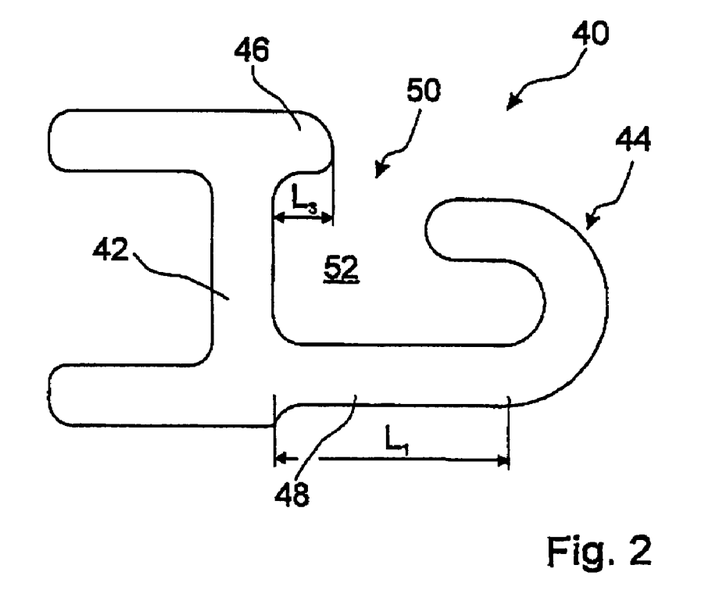
FIG. 2 shows a top view of the face side of an advancement of the profiled connecting element subject to the invention shown in FIG. 1 with an additional formed support strip.

FIG. 2 shows an advancement of the profiled connecting element 10 shown in FIG. 1. With this profiled connecting element 40, a support strip 46 is molded onto the flat side of the central strip 42, onto which the profiled attachment element 44 is molded as well, and said support strip 46 runs at an approximate right angle to the flat side of the central strip 42, and thus parallel to the transition section 48 of the profiled attachment element 44 and transitions flush into one of the two longitudinal edges of the central strip 42. The support strip 46 is molded to the central strip 42 relative to the profiled attachment element 44 such that the support strip 46 protrudes into the opening area 50 of the receiving channel 52 of the profiled attachment element 44 and covers it partially, however does not obstruct the insertion of the interlocking element into the receiving channel 52. The length $L_3$ of the support strip 46 is selected such that the ratio between the length $L_3$ of the support strip 46 and the length $L_1$ of the transition section 48 is about 1:4, thus having a length $L_3$ of about 10 mm in the presented advancement.

Figure 3:
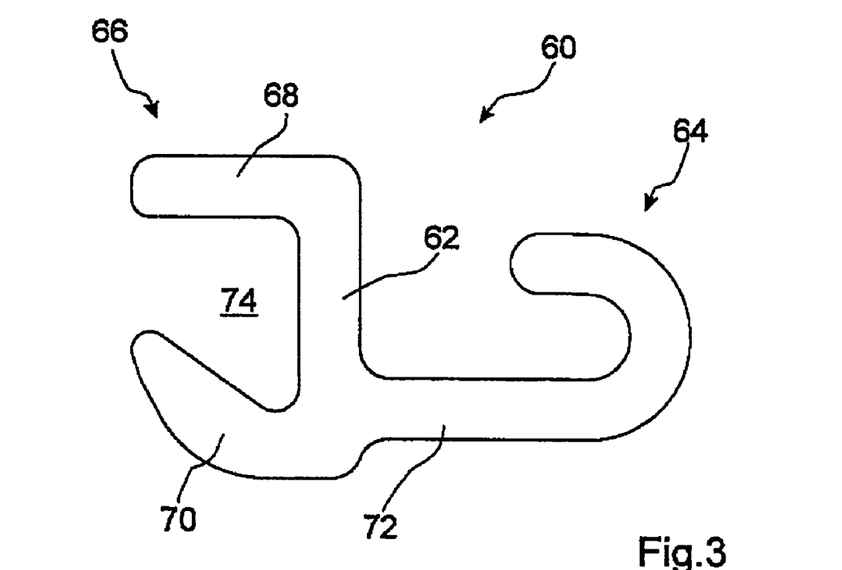
FIG. 3 shows a top view of the face side of a second exemplary embodiment of a profiled connecting element subject to the invention, which is designed for attachment to a club carrier.

FIG. 3 shows a second exemplary embodiment of a profiled connecting element 60 subject to the invention. The profiled connecting element 60 also features a central strip 62 with an profiled attachment element 64 and a profiled receiving element 66 molded onto it. In its design, the profiled attachment element 64 corresponds to the profiled attachment element 14 or 44, respectively shown in FIG. 1 or 2, respectively, such that a further description of the profiled attachment element 64 can be omitted.

Similarly, the profiled receiving element 66 features two support strips 68 and 70, whereby the first support strip 68, which is molded onto the longitudinal edge of the central strip 62, which is formed at a distance from the transition section 72, protrudes at approximately a right angle from the flat side of the central strip 62. The second support strip 70 that protrudes directly adjacent to the transition section 72 from the central strip 62, on the other hand, runs at an angle sloped at about 45° in relation to the flat side of the central strip 62 towards the first support strip 68 and ends at about the same height as the first support strip 68. This forms a support channel 74 with an approximately triangular cross-section, which is used to receive a so-called club carrier with a support section that exhibits an approximately wedge-shaped cross-section, as will be explained below.

Figure 4:
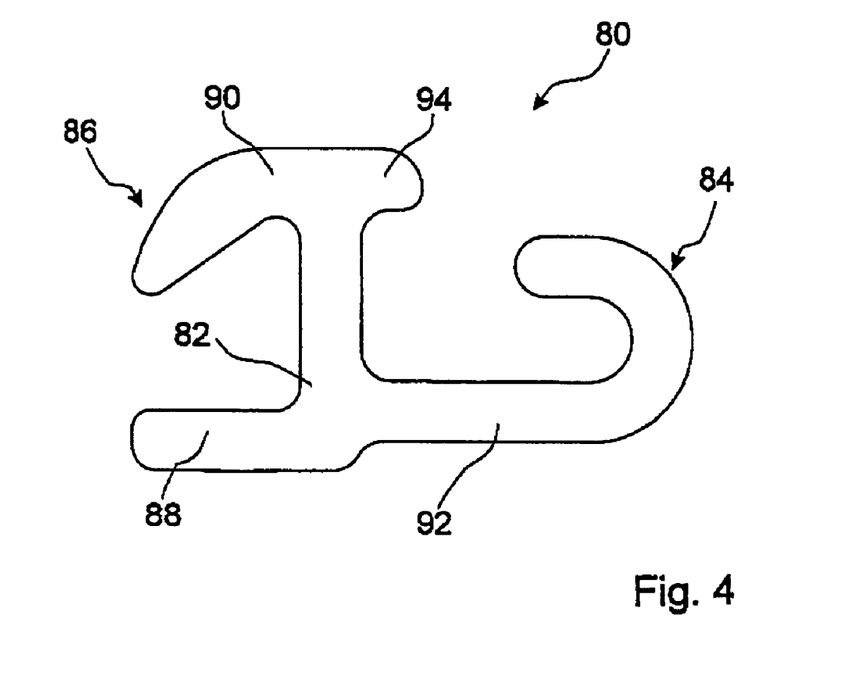
FIG. 4 shows a top view of the face side of an advancement of the profiled connecting element subject to the invention shown in FIG. 3.

FIG. 4 shows a top view of a profiled connecting element 80, and is an advancement of the profiled connecting element 60 shown in FIG. 3. The profiled connecting element 80 also exhibits a central strip 82 with an profiled attachment element 84 as well as a profiled receiving element 86 designed on it. However, with the profiled connecting element 80, the two support strips 88 and 90 of the profiled receiving element 86 are designed mirror-inverted at the central strip 82 compared to the profiled connecting element 60, such that the support strip 88 molded on near the transition section 92 of the profiled attachment element 84 runs at a right angle to the longitudinal direction of the central strip 82, while the support strip 90 runs sloped at an angle of about 45° towards the first support strip 88. With this mirror-inverted design, the profiled connecting element 80 can be attached to a club carrier in a mirror-inverted manner such that the profiled attachment element 84 can be attached to the club carrier pointing in the opposite direction when compared to the profiled attachment element 64 of the profiled connecting element 60. Additionally, a support strip 94 is provided near the support strip 90, as is the case with the profiled connecting element 40 shown in FIG. 2, where said support strip 94 interacts with the profiled attachment element 84 in the manner described in reference to FIG. 2.

Figures 5, 6:
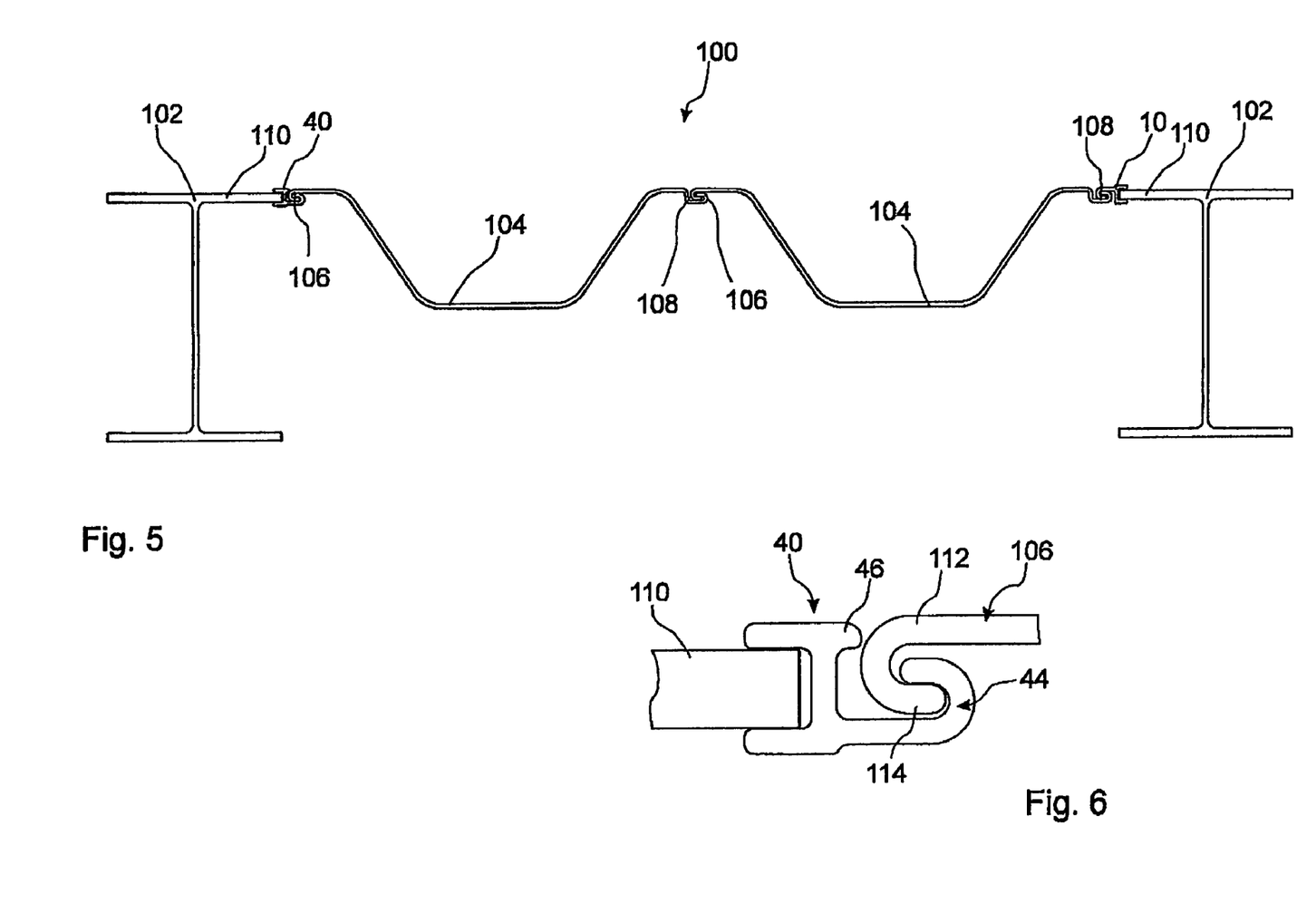
FIG. 5 shows a top view of a combination sheet pile wall, where the sheet piles are attached to I-beams through profiled connecting elements like the ones shown in FIG. 2.
FIG. 6 shows a magnified section of the combination sheet pile wall according to FIG. 5, wherein a top view of a profiled connecting element subject to the invention is shown arranged between a sheet pile and an I-beam carrier.

FIG. 5 shows a top view of a section of a combination sheet pile wall 100, which is formed of several I-beams 102 and two cold-rolled U-sheet piles 104 arranged between two of the I-beams 102. The U-sheet piles 104 are connected to each other through interlocking elements 106 and 108. The profiled connecting elements 10 and 40 shown in FIGS. 1 and 2 are used for attaching the U-sheet piles 104 to the I-beams 102, whereby the profiled connecting element 10 is attached to the I-beam 102 shown in FIG. 5 on the right with its profiled attachment element 14 pointing inward.

The I-beams 102 are designed in the conventional manner and in their cross-section exhibit two rectangular T-beams 110. As is shown in particular in FIG. 6, where a magnified section of FIG. 5 is presented, the profiled connecting element 40 subject to the invention is attached to the free end of the T-beam 110 of the I-beam 102 shown in FIG. 5 to the left and is slipped onto the end of the T-beam 110 with its profiled receiving element.

The two interlocking elements 106 and 108 of the U-sheet piles 104 are essentially designed identical and exhibit as a main connecting element a straight support section 112 that transitions into a semicircular, bent hook strip 114. The length of the support section 112 as well as the inside radius of the hook strip 114 are dimensioned such that the interlocking element 106 or 108, respectively, is held securely to the profiled attachment element 44 of the profiled connecting element 40 and can rest properly in it, whereby the support strip 46 that is designed near the profiled attachment element 44 prevents the interlocking element 106 from slipping from the receiving channel 52.

The profiled connecting element 10 can be used in the same manner in place of the profiled connecting element 40 shown in FIGS. 5 and 6. Furthermore, U-sheet piles or Z-sheet piles manufactured by hot-rolling can be used as well.

Figure 7:
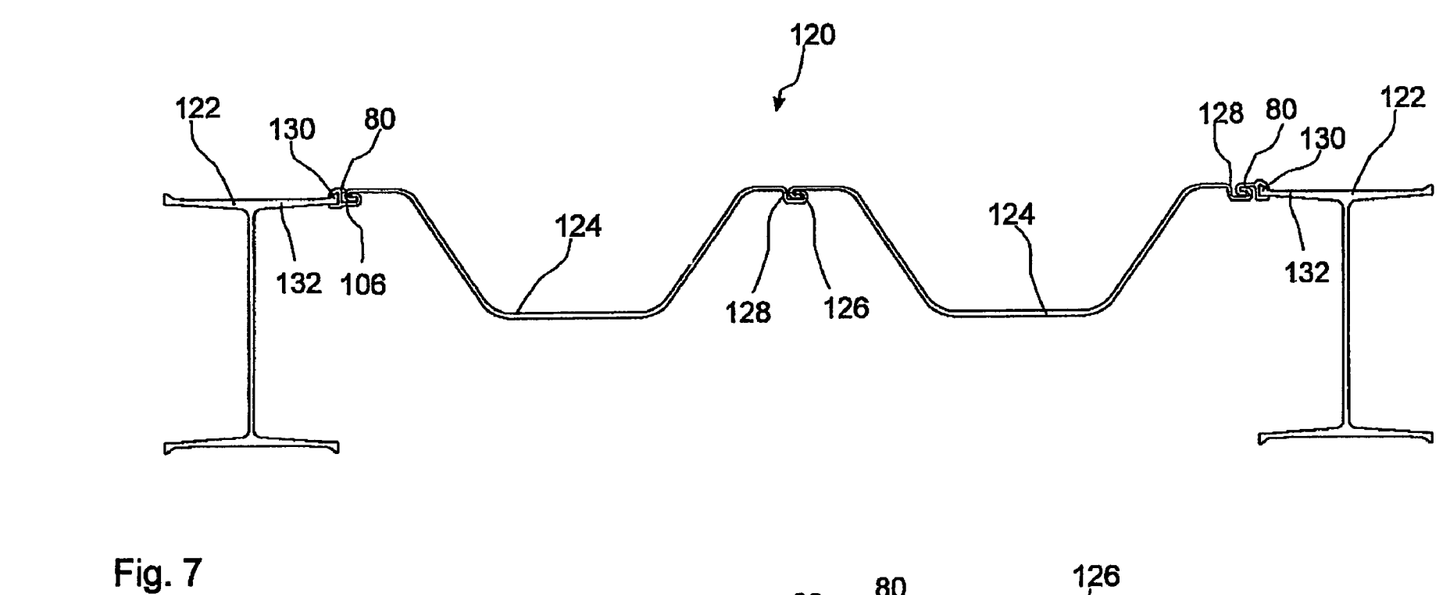
FIG. 7 shows a top view of a combination sheet pile wall, where the sheet pile walls are attached to club carriers through profiled connecting elements like the ones shown in FIGS. 3 and 4.

FIG. 7 shows a section of a second embodiment of a combination sheet pile wall 120. The combination sheet pile wall 120 exhibits several club carriers 122 as the carrier elements, whereby two U-sheet piles 124 are inserted between each of two adjacently arranged club carriers 122. The U-sheet piles 124 correspond to the U-sheet piles 104 described above and are also connected to one another through respectively shaped interlocking elements 126 and 128.

The two profiled connecting elements 60 and 80 described above in reference to FIGS. 3 and 4 are used to secure the U-sheet piles 124 at the two club carriers 122. As is shown in particular in FIG. 7, a problem-free connection of the U-sheet piles 124 to the club carriers 122 becomes possible when using the two differing profiled connecting elements 60 and 80. In this situation, the respective one interlocking element 126 of the sheet pile 124 is positioned with its hook strip facing inward, while the other interlocking element 128 points outward.

The profiled connecting element 60 is used to attach the interlocking element 128, which points outward, to a club carrier 122 and can be attached to the club carrier 122 with its profiled attachment element 64 pointing inward due to the design of the profiled receiving elements 66, while in contrast to it, the profiled connecting element 80 is attached to the club carrier 122 with its profiled attachment element 84 pointing outward.

Figure 8:
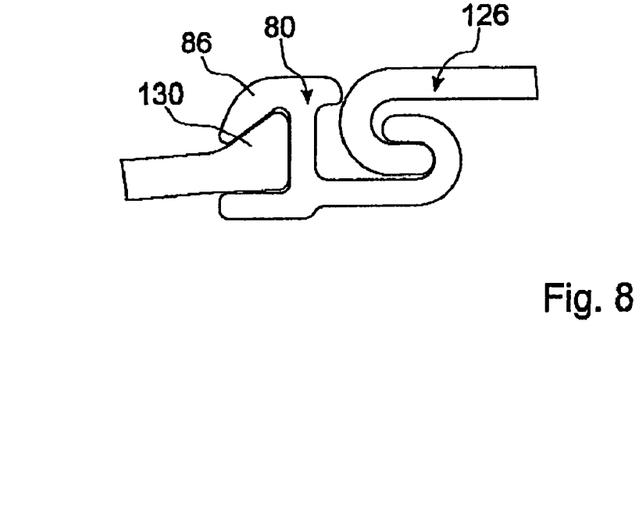
FIG. 8 shows a magnified section of the combination sheet pile wall according to FIG. 7, wherein a top view of a profiled connecting element subject to the invention is shown arranged between a sheet pile and a club carrier.

FIG. 8 shows a magnified section of the combination sheet pile wall 120, which presents the profiled connecting element 60 that is engaged in the one club carrier 122 and one of the U-sheet piles 124. With its profiled receiving element 86, the profiled connecting element 60 is slipped onto the support section 130 that expands in its cross-section wedge-like and is formed at the end of one of the T-beams 132 of the club carrier 122, such that the profiled connecting element 80 is held in a defined position at the club carrier 122. The profiled attachment element 64 is engaged in the interlocking element 126 of the U-sheet pile 124 in the same manner as has already been described in reference to the combination sheet pile wall 100. The sheet pile 124 is secured at the other club carrier 122 via the profiled connecting element 60 in a corresponding manner.

There has thus been shown and described a novel profiled connecting element and combination sheet pile wall with a profiled connecting element of this type which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A profiled connecting element for attaching sheet piles to carrier elements for the construction of a combination sheet pile wall consisting of carrier elements and with at least one sheet pile each arranged between two carrier elements, whereby the profiled connecting element exhibits a flat central strip onto which is formed (a) a profiled receiving element for the connection to the carrier element, wherein the profiled receiving element viewed in cross-section of the profiled connecting element includes two first support strips that protrude from one of the two flat sides of the central strip and between which a support section of the carrier element is to be inserted for the connection, and (b) a profiled attachment element for attaching an interlocking element of the sheet pile, wherein the profiled attachment element for the sheet pile includes (1) a straight transition section that, when viewed in its cross-section, protrudes at an at least approximately right angle from the other, opposed flat side of the central strip and transitions into a hook section with a semicircular cross-section and points in the direction of the other flat side, and (2) an end section extending from the hook section, and wherein the transition section, the hook section and the end section together with the flat side of the central strip form a receiving channel that is open on one side for the interlocking element of the sheet pile.

2. A profiled connecting element as set forth in claim 1, wherein the end section runs parallel to the transition section and the ratio of the length ($L_2$) of the end section to the length ($L_1$) of the transition section is in a range of 1:2 to 1:3.

3. A profiled connecting element as set forth in claim 1, wherein the ratio of the inside radius ($R_i$) of the semicircular hook section to the length ($L_1$) of the transition section is in a range of 1:4 to 1:5.

4. A profiled connecting element as set forth in claim 1, wherein a said profiled attachment element further includes an additional second support strip that protrudes at least approximately at a right angle from said other flat side of the strip and is molded to said other flat side, when viewed in the cross-section of the profiled connecting element, and which partially covers the open side of the receiving channel and is arranged at the central strip offset on the side outward in relation to the end section of the profiled attachment element, when viewed in the cross-section.

5. A profiled connecting element as set forth in claim 4, wherein the second support strip transitions with its flat side that points outward into one of the two longitudinal edges of the central strip.

6. A profiled connecting element as set forth in claim 4, wherein the second support strip extends parallel to the transition section and the ratio of the length ($L_3$) of the support strip to the length ($L_1$) of the transition section is in a range of 1:4 to 1:5.

7. A profiled connecting element as set forth in claim 1, wherein one of the first support strips of the receiving element protrudes at approximately a right angle from said one flat side of the central strip of the profiled connecting element, while the other of the first support strips protrudes from said one flat side of the central strip at an angle in the direction of the one first support strip, thereby to receive and retain a support section of the carrier element that has a wedge-shaped cross-section.

8. A profiled connecting element as set forth in claim 7, wherein the first support strip of the profiled receiving element which runs sloped at an angle to the flat side of the central strip is formed directly adjacent to the longitudinal edge of the central strip, near which the transition section of the profiled attachment element is formed.

9. A profiled connecting element as set forth in claim 7, wherein the first support strip of the profiled receiving element, which runs at least approximately at a right angle to the flat side of the central strip is formed directly adjacent to the longitudinal edge of the central strip, near which the transition section of the profiled attachment element is formed.

10. A profiled connecting element as set forth in claim 1, wherein the two first support strips of the receiving element run at least approximately parallel to each other and wherein the support of the carrier element to be inserted between the two first support strips has a rectangular cross-section.

11. A profiled connecting element as set forth in claim 1, wherein the two first support strips of the receiving element run at least approximately parallel to each other and wherein the support of the carrier element to be inserted between the two first support strips has a rectangular cross-section.

* * * * *